US009571825B2

(12) United States Patent
Otani et al.

(10) Patent No.: US 9,571,825 B2
(45) Date of Patent: Feb. 14, 2017

(54) LENS APPARATUS AND METHOD OF CONTROLLING OPERATION OF SAME

(71) Applicant: FUJIFILM Corporation, Tokyo (JP)

(72) Inventors: Kazunori Otani, Saitama (JP); Shinichi Shimotsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/850,568

(22) Filed: Sep. 10, 2015

(65) Prior Publication Data

US 2016/0007019 A1 Jan. 7, 2016

Related U.S. Application Data

(63) Continuation of application No. PCT/JP2013/081780, filed on Nov. 26, 2013.

(30) Foreign Application Priority Data

Mar. 13, 2013 (JP) .................................. 2013-049890

(51) Int. Cl.
*G02B 7/10* (2006.01)
*H04N 5/232* (2006.01)
(Continued)

(52) U.S. Cl.
CPC ............ *H04N 17/002* (2013.01); *G02B 7/102* (2013.01); *G03B 3/10* (2013.01); *G03B 5/02* (2013.01);
(Continued)

(58) Field of Classification Search
CPC ............. G03B 5/02; G03B 17/18; G03B 3/10; H04N 5/23212; H04N 5/23296; H04N 17/002; H04N 17/02; G02B 7/102; G06T 7/008
(Continued)

(56) References Cited

U.S. PATENT DOCUMENTS

| 2003/0128288 | A1* | 7/2003 | Kawamura | ........ H04N 5/23209 348/335 |
| 2008/0002033 | A1* | 1/2008 | Ito | ...................... H04N 5/23212 348/211.99 |
| 2008/0211957 | A1* | 9/2008 | Ishikawa | ................ H04N 5/247 348/345 |

FOREIGN PATENT DOCUMENTS

| JP | 10-186209 | 7/1998 |
| JP | 2002-182100 | 6/2002 |

(Continued)

OTHER PUBLICATIONS

International Search Report PCT/JP2013/081780 dated Dec. 24, 2013.

*Primary Examiner* — Lin Ye
*Assistant Examiner* — Marly Camargo
(74) *Attorney, Agent, or Firm* — Young & Thompson (57) ABSTRACT

Notification is given of the fact that a television camera lens has developed a malfunction. An extender lens includes an imaging lens having a 1× magnification and an imaging lens having a 2× magnification. For each of these imaging lenses, a master lens is adjusted in such a manner that the light-receiving surface of an image sensor will be brought to an in-focus position. The master lens adjustment processing is executed periodically and data indicating a history of amounts of adjustment of the master lens is stored in memory per imaging lens. Data indicating the history of amounts of adjustment of the master lens is read from the memory. Whether the television camera lens is malfunctioning is detected from the read data indicating the history. If a malfunction is detected, an error LED emits light to notify of the malfunction.

10 Claims, 10 Drawing Sheets

(51) Int. Cl.
   *H04N 17/00*    (2006.01)
   *G03B 17/18*    (2006.01)
   *G03B 5/02*     (2006.01)
   *G03B 3/10*     (2006.01)
(52) U.S. Cl.
   CPC .......... *G03B 17/18* (2013.01); *H04N 5/23212* (2013.01); *H04N 5/23296* (2013.01)
(58) Field of Classification Search
   USPC ....... 348/240.99, 240.3, 345, 335, 175, 177, 348/180, 187; 359/811–830; 396/80, 79, 396/104, 133
   See application file for complete search history.

(56) References Cited

FOREIGN PATENT DOCUMENTS

| | | |
|---|---|---|
| JP | 2003-057528 | 2/2003 |
| JP | 2004-233892 | 8/2004 |
| JP | 2005-070635 | 3/2005 |

\* cited by examiner

| IMAGING MAGNIFICATION \ DATE AND TIME | NOVEMBER 1, 2012 | DECEMBER 1, 2012 | JANUARY 1, 2013 |
|---|---|---|---|
| 1× | D11 | D21 | D31 |
| 2× | D12 | D22 | D32 |

Fig. 12

LENS APPARATUS AND METHOD OF CONTROLLING OPERATION OF SAME

CROSS-REFERENCE TO RELATED APPLICATIONS

This application is a Continuation of PCT International Application No. PCT JP2013/081780 filed on Nov. 26, 2013, which claims priority under 35 U.S.C. §119(a) to Japanese Patent Application No. 2013-049890 filed Mar. 13, 2013. Each of the above application(s) is hereby expressly incorporated by reference, in its entirety, into the present application.

BACKGROUND OF THE INVENTION

Field of the Invention

This invention relates to a lens apparatus and to a method of controlling the operation thereof.

Description of the Related Art

A high-performance lens apparatus such as a television lens incorporates a magnifying lens, which is referred to as an extender lens, and a master lens for adjusting in-focus position (focal point). The extender lens is capable of changing imaging magnification to a plurality of magnifications such as magnification by a factor of 1 or 2. The master lens is for adjusting flange back.

There is a system that adjusts the position of a focusing lens in accordance with zoom position based upon the corresponding relationship between zoom-end positions and focal point (Patent Document 1), a system that applies a focusing-position correction in accordance with zoom position (Patent Document 2), and a system that detects position information from a potentiometer, performs a correction computation using a control circuit and decides the master-lens position (Patent Document 3).

Patent Document 1: Japanese Patent Application Laid-Open No. 2004-233892

Patent Document 2: Japanese Patent Application Laid-Open No. 2003-57528

Patent Document 3: Japanese Patent Application Laid-Open No. 10-186209

Since an extender lens has its in-focus position adjusted at the time of shipment from the factory, there will be no shift in the in-focus position even if the imaging magnification is changed. Although there are instances where the lens cannot be maintained in an ideal state and the in-focus position may shift owing to the effects of the environment and the passage of time and the like, the user (cameraman) cannot tell that the in-focus position has shifted. As set forth above, Patent Document 1 adjusts the position of a focusing lens in accordance with zoom position, Patent Document 2 corrects focusing position in accordance with zoom position, and Patent Document 3 detects position information from a potentiometer and decides the position of the master lens, but none of these take into consideration the above-mentioned case where a shift in in-focus position occurs. Although the shift in in-focus position is caused by some failure, the user cannot determine whether the lens apparatus has malfunctioned.

SUMMARY OF THE INVENTION

The present invention is so arranged that a user can ascertain whether or not a lens apparatus has malfunctioned.

A lens apparatus according to the present invention comprises: an imaging optical system for forming the image of a subject on an imaging plane; an extender optical system capable of changing over among a plurality of imaging magnifications; a master optical system for adjusting in-focus position; a master optical system adjustment amount history memory for storing a history of amounts of adjustment of the master optical system obtained by adjusting the in-focus position by the master optical system per each of the multiple magnifications of the extender lens optical system; a malfunction detection unit for detecting whether or not there is a malfunction in the optical systems of the lens apparatus based upon multiple histories that have been stored the master optical system adjustment amount history memory per each of the multiple magnifications of the extender lens optical system; and a malfunction notification unit for giving notification of a malfunction in response to detection of the malfunction by the malfunction detection unit.

The present invention also provides a method of controlling operation suited to a lens apparatus. Specifically, the present invention provides a method of controlling operation of a lens apparatus having an imaging optical system for forming the image of a subject on an imaging plane, an extender optical system capable of changing over among a plurality of imaging magnifications and a master optical system for adjusting in-focus position, comprising steps of: storing a history amounts of adjustment of the master optical system obtained by adjusting the in-focus position by the master optical system per each of the multiple magnifications of the extender lens optical system; detecting whether or not there is a malfunction in the optical systems of the lens apparatus based upon multiple histories stored per each of the multiple magnifications of the extender lens optical system; and giving notification of a malfunction in response to detection of the malfunction.

In accordance with the present invention, the imaging magnification of an extender lens is changed over and a master optical system has its in-focus position adjusted in such a manner that the in-focus position will lie on an imaging plane per imaging magnification to which the changeover has been made. Such adjustment of the in-focus position is performed periodically or aperiodically. A history of amount of adjustment of the master optical system is obtained for each of multiple imaging magnifications of the extender optical system, and the history is stored in a master optical system adjustment amount history memory. Whether or not a malfunction has occurred in an optical system of the lens apparatus is detected based upon the history of amounts of adjustment of the multiple imaging magnifications, which history has been stored in the master optical system adjustment amount history memory. If a malfunction is detected, notification of the malfunction is given. By virtue of being notified of a malfunction, the user can ascertain that an ideal state cannot be maintained and that the in-focus position has shifted owing to the effects of the environment and elapse of time.

The malfunction detection unit detects, for example, a faulty location in the optical systems that constitute the lens apparatus, and the malfunction notification unit gives notification of the faulty location detected by the malfunction detection unit.

The apparatus may further comprise a malfunction occurrence possibility detection unit for detecting whether there is a possibility that a malfunction will occur in the lens apparatus, based upon the history of amounts of adjustment of the master optical system with regard to the multiple imaging magnifications of the extender optical system, which history has been stored in the master optical system adjustment amount history memory; and a warning unit, responsive to a determination by the malfunction occurrence possibility detection unit that there is a possibility that a malfunction will occur, for issuing a warning to inform of the possibility that a malfunction will occur.

By way of example, the malfunction detection unit, responsive to the fact that amounts of adjustment of the master optical system corresponding to some of the imaging magnifications among the multiple imaging magnifications of the extender optical system indicate a change with time and, moreover, the fact that amounts of adjustment of the master optical system corresponding to the other imaging magnifications do not indicate a change with time (though a slight change with time is permissible, and it will suffice if there is substantially no change with time), for detecting that there is a malfunction in the extender optical system with regard to some of the imaging magnifications, based upon the history of amounts of adjustment of the master optical system with regard to the multiple imaging magnifications of the extender optical system, which history has been stored in the master optical system adjustment amount history memory.

By way of example, the malfunction detection unit, while holding below a fixed value a difference between amounts of adjustment of the master optical system corresponding to respective ones of the plurality of imaging magnifications of the extender optical system, detects that there is a malfunction in the master optical system in response to amounts of adjustment indicating a tendency to increase or a tendency to decrease with time.

By way of example, the malfunction detection unit detects that there is a malfunction in an optical system other than the extender optical system and master optical system in response to the fact that a ratio between the amounts of adjustment of the master optical system corresponding to respective ones of the plurality of imaging magnifications of the extender optical system corresponds to (or substantially agrees with) a ratio between the multiple imaging magnifications of the extender optical system.

By way of example, the malfunction detection unit, responsive to the fact that amounts of adjustment of the master optical system corresponding to some of the imaging magnifications among the multiple imaging magnifications of the extender optical system indicate a change with time and, moreover, the fact that amounts of adjustment of the master optical system corresponding to the other imaging magnifications do not indicate a change with time, for detecting that there is a malfunction in the extender optical system with regard to some of the imaging magnifications, based upon the history of amounts of adjustment of the master optical system with regard to the multiple imaging magnifications of the extender optical system, which history has been stored in the master optical system adjustment amount history memory.

By way of example, the malfunction detection unit, while holding below a fixed value a difference between amounts of adjustment of the master optical system corresponding to respective ones of the multiple imaging magnifications of the extender optical system, detects that there is a malfunction in the master optical system in response to amounts of adjustment indicating a tendency to increase or a tendency to decrease with time.

By way of example, the malfunction detection unit detects that there is a malfunction in an optical system other than the extender optical system and the master optical system in response to the fact a ratio between the amounts of adjustment of the master optical system corresponding to respective ones of the multiple imaging magnifications of the extender optical system corresponds to a ratio between the multiple imaging magnifications of said extender optical system.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
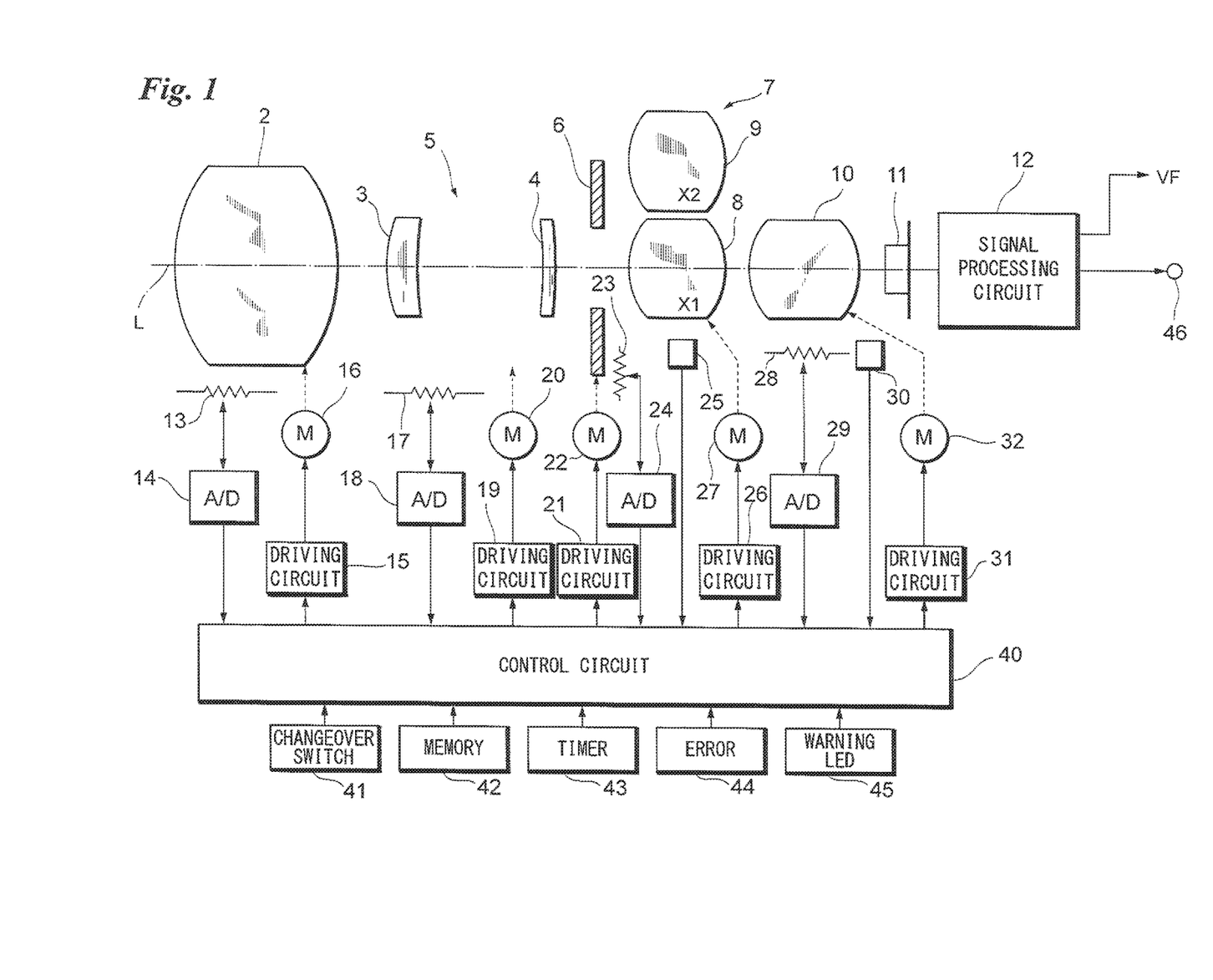
FIG. 1 is a block diagram illustrating the electrical configuration of a lens for a television camera.

FIG. 1 is a block diagram illustrating the electrical configuration of a lens 1 for a television camera.

The overall operation of the television camera lens 1 is controlled by a control circuit 40.

The television camera lens 1 includes an image sensor 11. Placed in front of the image sensor 11 are a focusing lens 2, a zoom lens 5, a diaphragm 6, an extender lens (lens group, optical system) 7 and a master lens (lens group, optical system) 10. The television camera lens 1 has an optical axis L that passes through the centers of the focusing lens 2, zoom lens 5, diaphragm 6, master lens 10 and light-receiving surface of the image sensor 11. The zoom lens 5 is constituted by a variable power lens 3 and a correction lens 4. The extender lens 7 has a turret plate (not shown) to which are attached an imaging lens 8 having 1× magnification and an imaging lens 9 having 2× magnification. The turret plate of the extender lens 7 rotates in response to a changeover control signal from a changeover switch 41, whereupon either the 1× imaging lens 8 or 2× imaging lens 9 is positioned on the optical axis L.

The position of the focusing lens 2 is detected by a detector 13. A detection signal indicating the lens position of the focusing lens 2 detected by the detector 13 is converted to digital detection data in an analog/digital conversion circuit 14 and the data is input to the control circuit 40. The cameraman turns a focusing ring (not shown), thereby setting the amount of focus. The set amount of focus and the lens position of the focusing lens 2 represented by the detected digital detection data are compared by the control circuit 40 which, based upon the compared values, generates data indicating the amount of drive of the focusing lens 2. The generated data indicating the amount of drive is applied to a driving circuit 15. A focusing motor 16 is controlled by the driving circuit 15, whereby the lens position of the focusing lens 2 is adjusted.

The variable power lens 3 constituting the zoom lens 5 varies the focal length and the correction lens 4 applies a correction in such a manner that the focal point will not shift. The variable power lens 3 and correction lens 4 are moved in a fixed relationship along the optical axis L by rotating a zoom cam barrel (not shown) that rotates in accordance with rotation of a zoom ring (not shown) operated by the cameraman. The zoom position of the zoom lens 5 is detected by a detector 17. A detection signal that is output from the detector 17 is converted to digital detection data in an analog/digital conversion circuit 18 and the data is input to the control circuit 40. The amount of zoom set by the zoom ring and the lens position of the zoom lens 5 represented by the detected digital detection data are compared by the control circuit 40 which, based upon the compared values, generates data indicating the amount of drive of the zoom lens 5. The generated data indicating the amount of drive is applied to a driving circuit 19. A zoom motor 20 is controlled by the driving circuit 19, whereby the lens positions of the variable power lens 3 and correction lens 4 constituting the zoom lens 5 are adjusted.

The aperture value of the diaphragm 6 is detected by a detector 23. A detection signal that is output from the detector 23 is converted to digital detection data in an analog/digital conversion circuit 24 and the data is input to the control circuit 40. Further, data indicating amount of drive is generated in accordance with amount of rotation of a diaphragm ring (not shown) operated by the cameraman. The generated data indicating the amount of drive and data indicating the detected amount of drive are compared and data indicating the amount of drive of the diaphragm 6 is generated based upon the compared values. The generated data indicating the amount of drive is applied to a driving circuit 21. A diaphragm motor 22 is controlled by the driving circuit 21, whereby the diaphragm 6 is set to a desired aperture value.

Provided in the vicinity of the extender lens 7 is a photo interrupter (detector) 25 for detecting which of the imaging lenses 8, 9 that constitute the extender lens 7 has been positioned on the optical axis L. The output signal from the photo interrupter 25 is input to the control circuit 40 so that whether the imaging lens 8 or 9 designated by the changeover switch 41 has been positioned on the optical axis L is detected. If neither the imaging lens 8 nor 9 designated by the changeover switch 41 has been positioned on the optical axis L, driving data is generated by the control circuit 40 in such a manner that the designated imaging lens 8 or 9 will be positioned on the optical axis L, and the driving data is applied to a driving circuit 26. An extender motor 27 is controlled by the driving circuit 26 to position the imaging lens 8 or 9 on the optical axis L.

A flange-back adjustment knob 30 for setting the amount of adjustment to the master lens 10 is provided. Data indicating the amount of adjustment set by the knob 30 is input to the control circuit 40. Further, a detection signal that is output from a potentiometer (detector 28) that detects the amount of movement of the master lens 10 is input to an analog/digital conversion circuit 29, the signal is converted to digital detection data and the data is input to the control circuit 40. The data indicating the amount of adjustment set by the knob 30 and the digital detection data indicating the amount of movement of the master lens 10 are compared in the control circuit 40 and driving data is generated based upon the compared values. The generated driving data is applied to a driving circuit 31 so that a master lens motor 32 is driven. By moving the master lens 10 along the optical axis L, a focusing correction is performed so as to bring the image of the subject into focus on the imaging plane of the image sensor 11.

A video signal that is output from the image sensor 11 is input to a signal processing circuit 12 and is subjected to processing such as sampling processing, a white balance adjustment and a gamma correction, whereby a television signal is generated. The generated television signal is output to a viewfinder, where the signal is reproduced, and is applied to an output terminal 46.

Further connected to the control circuit 40 are a memory 42, a timer 43 for measuring date and time, and, as will be described later, an error LED 44 which, when a malfunction occurs in an optical system constituting the television camera lens 1, emits light to notify the cameraman of the malfunction, and a warning LED 45 which, when there is increased likelihood that a malfunction will occur, emits light to warn the cameraman. As will be described in detail below, the control circuit 40 detects whether or not there is a malfunction in the television camera lens 1 based upon multiple histories of amounts of adjustment of the master lens 10 that have been stored in the memory 42 per each of a plurality of imaging magnifications of the extender lens 7.

Figure 2:
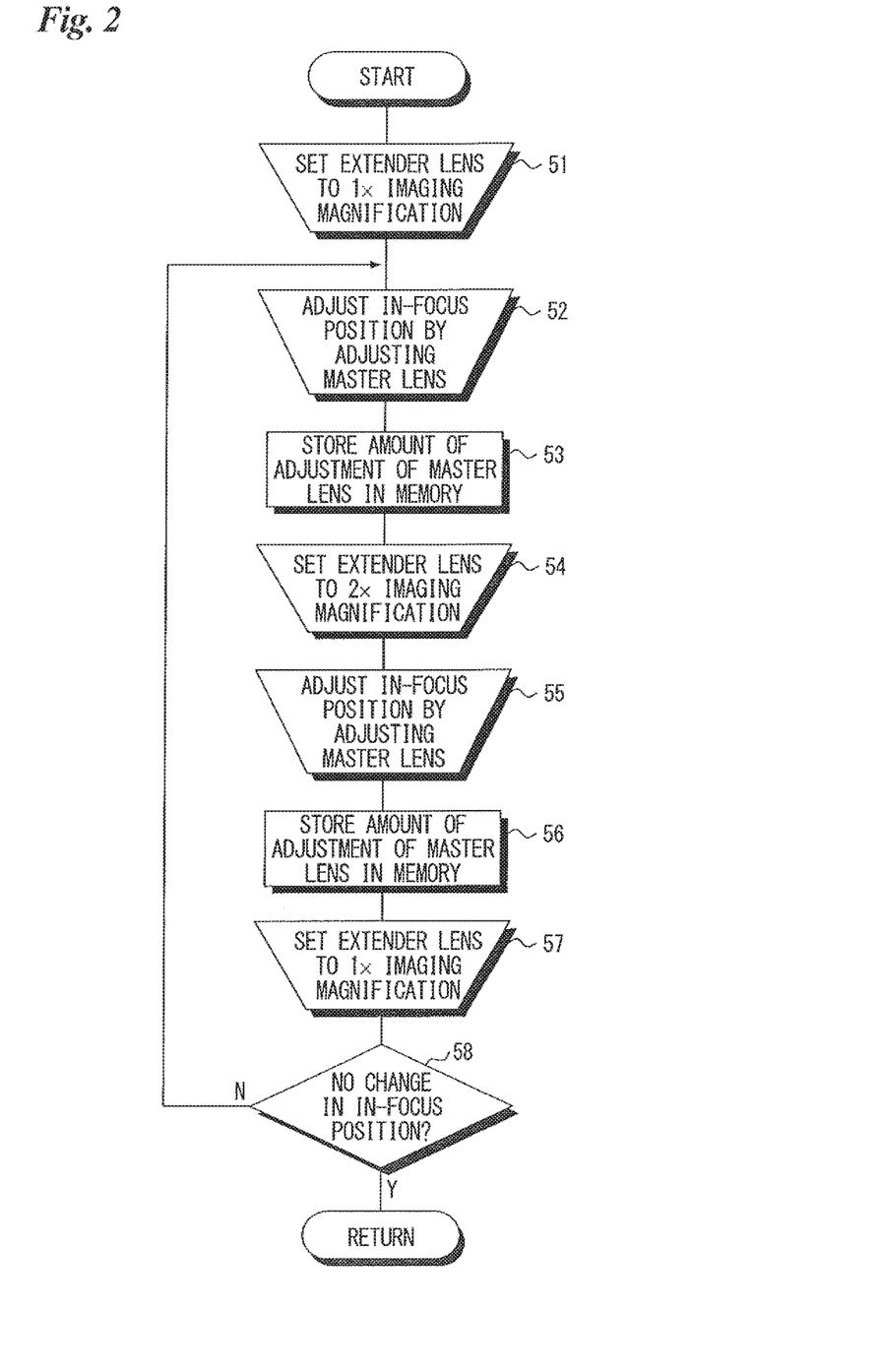
FIG. 2 is a flowchart illustrating processing for adjusting a master lens.

FIG. 2 is a flowchart illustrating processing for adjusting the master lens 10.

The changeover switch 41 is operated by a maintenance man (or by the user such as the cameraman) to place the imaging lens 8, which has the 1× imaging magnification, on the optical axis L (step 51). The flange-back adjustment knob 30 is operated by the maintenance man to adjust the focal point in such a manner that the light-receiving surface of the image sensor 11 is brought to the in-focus position (step 52). When an adjustment-quit switch (not shown) is set by the maintenance man, data indicating the amount of adjustment of the master lens in the imaging lens 8 having the 1× imaging magnification is stored in the memory 42 in correspondence with the date and time (step 53).

Similarly, the changeover switch 41 is operated by a maintenance man to place the imaging lens 9, which has the 2× imaging magnification, on the optical axis L (step 54). The flange-back adjustment knob 30 is operated by the maintenance man to adjust the focal point in such a manner that the light-receiving surface of the image sensor 11 is brought to the in-focus position (step 55). When an adjustment-quit switch (not shown) is set by the maintenance man, data indicating the amount of adjustment of the master lens in the imaging lens 9 having the 2× imaging magnification is stored in the memory 42 in correspondence with the date and time (step 56).

Next, the changeover switch 41 is operated by a maintenance man to place the imaging lens 8, which has the 1× imaging magnification, on the optical axis L (step 57). If there is no change, with the light-receiving surface of the image sensor 11 lying at the in-focus position ("YES" at step 58), processing for adjusting the master lens 10 is terminated. If the in-focus position has shifted from the light-receiving surface of the image sensor 11 ("NO" at step 58), the flange-back adjustment knob 30 is operated again to adjust the in-focus position (step 52). In a case where the in-focus position has shifted from the light-receiving surface of the image sensor 11, data indicating the amount of adjustment obtained by adjusting the in-focus position again is written over the data indicating the amount of adjustment obtained immediately before.

The processing for adjusting the master lens 10 shown in FIG. 2 is executed periodically or aperiodically. Whenever the adjustment processing is executed, the data indicating the amount of adjustment obtained in association with the particular imaging magnification is stored in correspondence with the date and time at which the adjustment processing was executed. As a result, a history indicating the amounts of adjustment of the master lens 10 is obtained.

Figure 3:
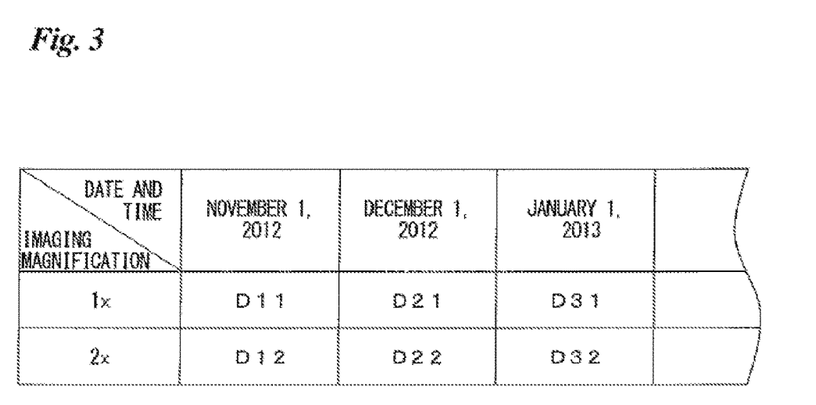
FIG. 3 is an example of a history indicating amounts of adjustment of a master lens.

FIG. 3 is an example of a history indicating amounts of adjustment of the master lens 10 stored in memory 42.

Although the history shown in FIG. 3 is a history of processing for adjusting the master lens 10 executed periodically every month, the processing need not be executed monthly and may be executed aperiodically. Amounts of adjustment of the master lens 10 obtained by executing processing for adjusting the master lens 10 have been stored in correspondence with the imaging lens 8 having the 1× imaging magnification. Similarly, amounts of adjustment of the master lens 10 obtained by executing processing for adjusting the master lens 10 have been stored in correspondence with the imaging lens 9 having the 2× imaging magnification.

For example, with regard to the processing for adjusting the master lens 10 executed on Nov. 1, 2012, the amount of adjustment of the imaging lens 8 having the 1× imaging magnification is D11, and the amount of adjustment of the imaging lens 9 having the 2× imaging magnification is D12. Similarly, with regard to the processing for adjusting the master lens 10 executed on Dec. 1, 2012, the amount of adjustment of the imaging lens 8 having the 1× imaging magnification is D21, and the amount of adjustment of the imaging lens 9 having the 2× imaging magnification is D22. Thus, as set forth above, a history indicating amounts of adjustment of the master lens 10 is obtained for each of the imaging lenses 8 and 9 constituting the extender lens 7.

FIGS. 4 to 7 illustrate relationships between amount of adjustment of the master lens 10 and elapsed time from time of shipment from the factory.

The vertical axis indicates amount of adjustment of the master lens 10. The amount of adjustment of the master lens 10 indicates amount of deviation from a reference position (for example, a position indicating time of shipment from the factory). The amount of deviation can be in the positive direction (for example, the direction from the reference position to the side of the image sensor 11) or in the negative direction (for example, the direction from the reference position toward the side of the extender lens 7). In FIGS. 4 to 7, the amount of correction of the master lens 10 is illustrated in the case of the positive direction only. Specifically, the larger the amount of correction of the master lens 10 in the upward direction, the more this amount of correction increases in the positive direction. However, there is also a case where the amount of correction of the master lens 10 increases in the negative direction, in which case the amount of correction of the master lens 10 increases in the negative direction. The horizontal axis indicates elapse of time from time of shipment from the factory. Elapsed time increases from left to right.

In this embodiment, whether the television camera lens 1 has malfunctioned and, if it has malfunctioned, where the malfunction is located, are detected from the relationship between amount of correction of the master lens 10 and elapsed time from time of shipment from the factory.

Figure 4:
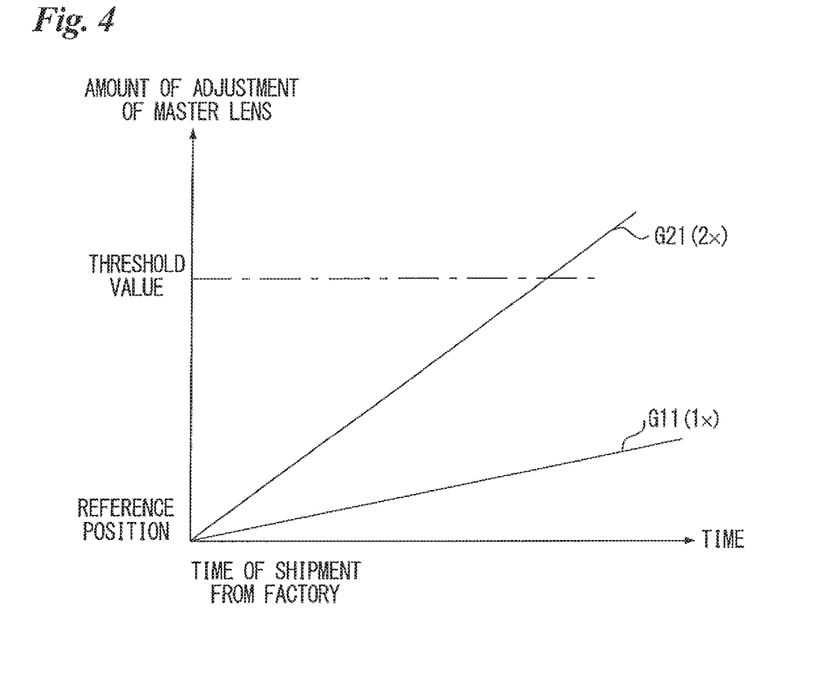
FIGS. 4 to 7 illustrate relationships between amounts of adjustment of a master lens and change with time.

With reference to FIG. 4, the amount of adjustment of the master lens 10 with regard to the imaging lens 8 having the 1× imaging magnification does not change much even with elapse of time, as indicated by graph G11. However, the amount of adjustment of the master lens 10 with regard to the imaging lens 9 having the 2× imaging magnification does change greatly with elapse of time, as indicated by graph G21. In such case it is considered that a malfunction has occurred in the adjusting section of the imaging lens 9. In this case, therefore, this embodiment is such that the error LED 44 emits light if the amount of adjustment of the master lens 10 exceeds a threshold value. It goes without saying that, in a case where the amount of adjustment of the master lens 10 having the 1× imaging magnification changes greatly with elapse of time without much change in the amount of adjustment of the master lens 10 having the 2× imaging magnification even with elapse of time, it is considered that a malfunction has occurred in the adjusting section of the imaging lens 8.

Figure 5:
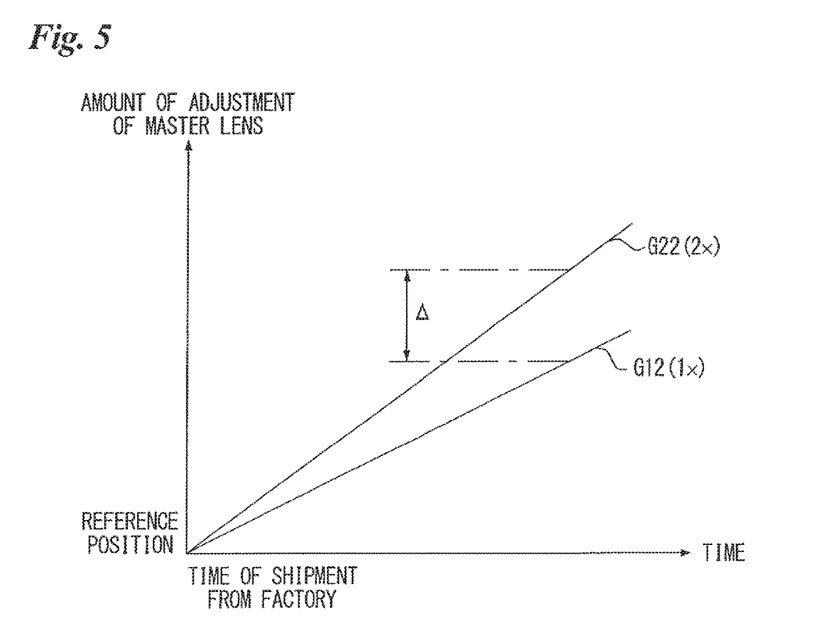

With reference to FIG. 5, it is considered that the extender lens 7 is free of malfunction but that the master lens 10 has developed a problem in a case where amount of adjustment of the master lens 10 with regard to the imaging lens 8 having the 1× imaging magnification, as indicated by graph G12, and amount of adjustment of the master lens 10 with regard to the imaging lens 9 having the 2× imaging magnification, as indicated by graph G22, both have a tendency to increase (or to decrease) by substantially the same amount with elapse of time. It is considered that the master lens 10 has a malfunction, in which case the error LED 44 will emit light, if the amounts of adjustment of the master lens 10 have a tendency to increase (or to decrease) (it is considered that a tendency to increase or to decrease will be by substantially the same amount), as indicated by graphs G12 and G22, with a difference Δ falling within a difference threshold value, where the difference Δ is between the amount of adjustment of the master lens 10 with regard to the imaging lens 8 having the 1× imaging magnification and the amount of adjustment of the master lens 10 with regard to the imaging lens 9 having the 2× imaging magnification.

Figure 6:
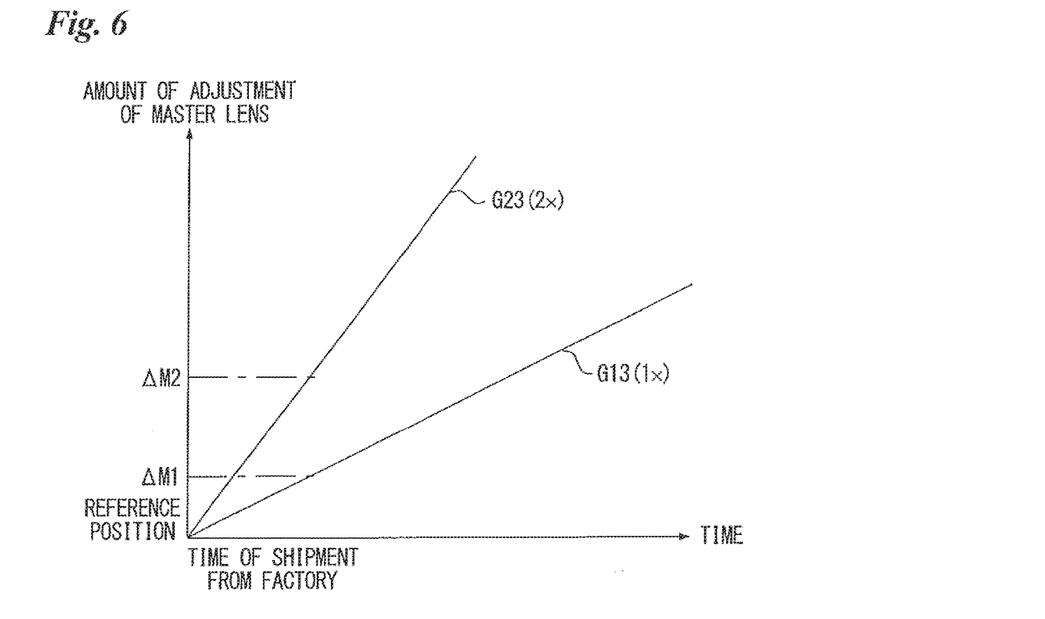

With reference to FIG. 6, it is considered that the extender lens 7 and master lens 10 are free of malfunction but that an optical system other than that of the extender lens 7 and master lens 10 has a malfunction in a case where the ratio between an amount of adjustment ΔM1 of the master lens 10 with regard to the imaging lens 8 having the 1× imaging magnification, as indicated by graph G13, and an amount of adjustment ΔM2 of the master lens 10 with regard to the imaging lens 9 having the 2× imaging magnification, as indicated by graph G23, corresponds to the ratio between the imaging magnifications.

Figure 7:
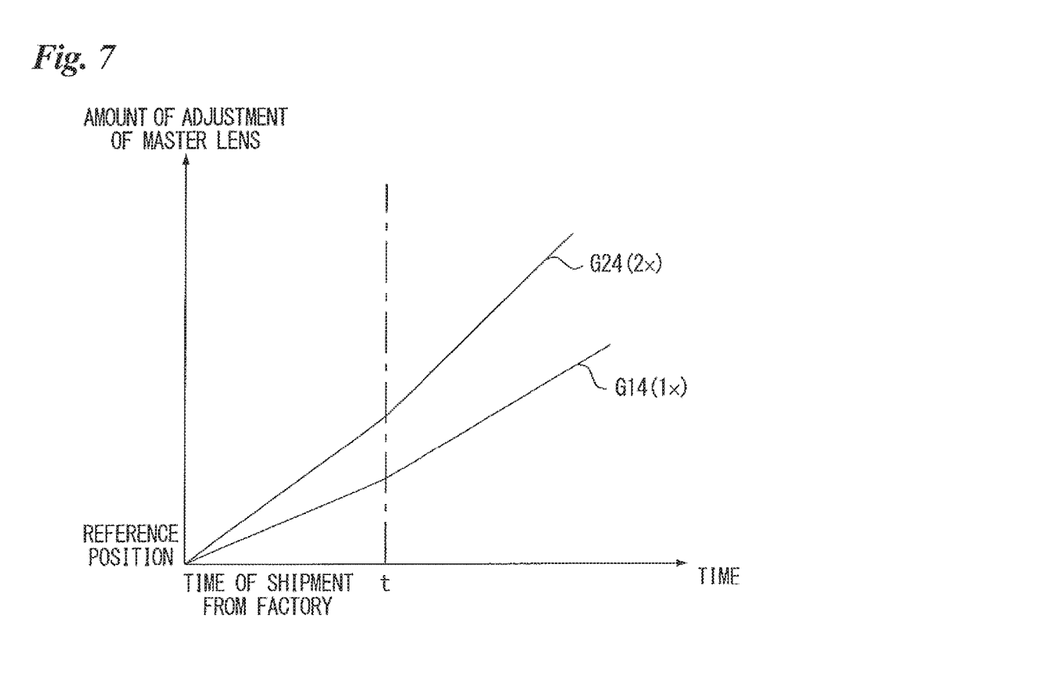

With reference to FIG. 7, it is considered that the zoom lens 5 has a malfunction in a case where the ratio between amount of adjustment of the master lens 10 with regard to the imaging lens 8 having the 1× imaging magnification, as indicated by graph G14, and amount of adjustment of the master lens 10 with regard to the imaging lens 9 having the 2× imaging magnification, as indicated by graph G24, corresponds to the ratio between the imaging magnifications, as shown in FIG. 6, until a certain time t, but no longer corresponds to the ratio between the imaging magnifications from the certain time t onward.

Since the relationship between amounts of adjustment of the master lens 10 and elapsed time is obtained, as shown in FIGS. 4 to 7, from the history of amounts of adjustment of the master lens 10 per the imaging lenses 8 and 9 having different imaging magnifications, as shown in FIG. 3, whether the television camera lens 1 has malfunctioned and where the fault, if any, is located can be ascertained from this relationship.

Figure 8:
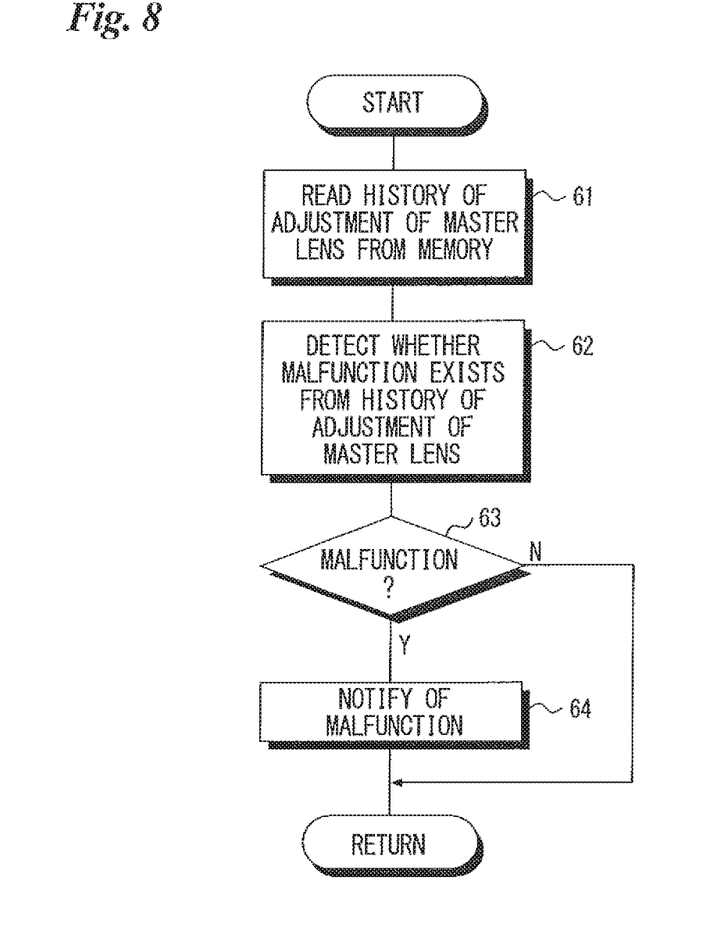
FIGS. 8 and 9 are flowcharts illustrating malfunction notification processing.

FIG. 8 is a flowchart illustrating malfunction notification processing.

When the in-focus position of the master lens 10 is adjusted and data indicating the history of amounts of adjustment of the master lens 10 is stored in the memory 42, as described above, the data indicating this history is read out of the memory 42 (step 61). As for the time at which the data indicating this history is read out of the memory 42, the television camera lens may be provided with a diagnostic mode switch (not shown) or the like and the read-out time may be that at which the diagnostic mode has been set by the switch. Alternatively, the read-out time may be that at which a fixed period of time has elapsed.

Whether the television camera lens 1 has a faulty location is detected depending upon whether the data read out of the memory 42 indicating the history of amounts of adjustment of the master lens 10 indicates a characteristic of the kind shown in FIGS. 4 to 7 (step 62). If the lens does have a faulty location ("YES" at step 63, the error LED 44 emits light to notify of the fact that there is a malfunction somewhere in the television camera lens 1 (step 64). If the lens does not have a malfunction ("NO" at step 63), then the processing of step 64 is skipped.

Figure 9:
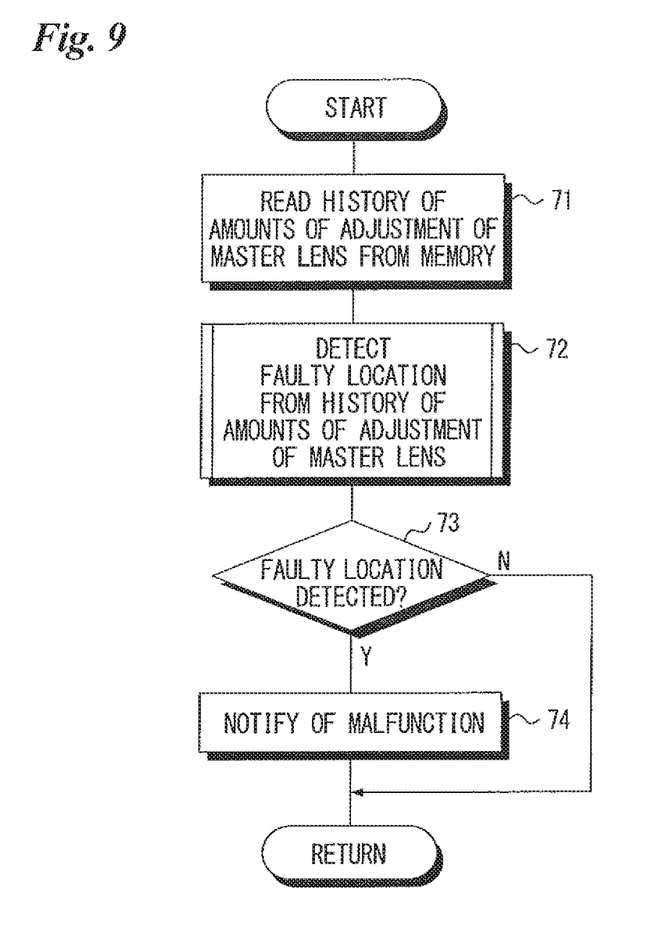

FIG. 9 is a flowchart illustrating other malfunction notification processing.

Data indicating the history of amounts of adjustment of the master lens 10 is read out of the memory 42 in a manner similar to that described above, and a faulty location is detected from the read data (step 72). If a faulty location is detected ("YES" at step 73), notification is given of the detected faulty location is given (step 74). If a faulty location is not detected ("NO" at step 73), then the processing of step 74 is skipped.

In the processing shown in FIG. 8, whether a malfunction has occurred or not is detected but the faulty location is not detected. In the processing shown in FIG. 9, however, the faulty location is detected and repair is facilitated as a result. An error LED would be provided in association with each of the lenses such as the zoom lens 5, extender lens 7 and master lens 10, and the error LED corresponding to the detected faulty location would emit light, thereby notifying of the faulty location.

Figure 10:
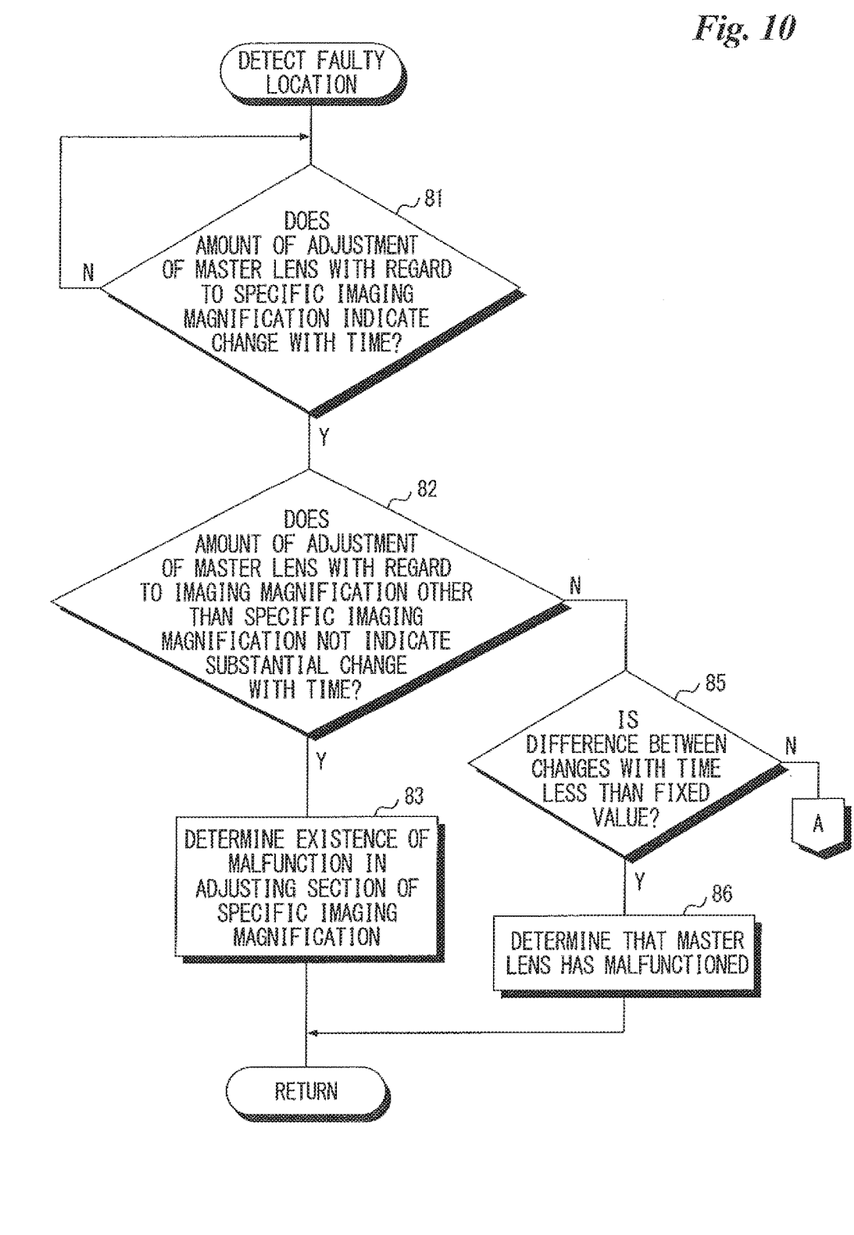
FIGS. 10 and 11 are flowcharts illustrating faulty location detection processing.
Figure 11:
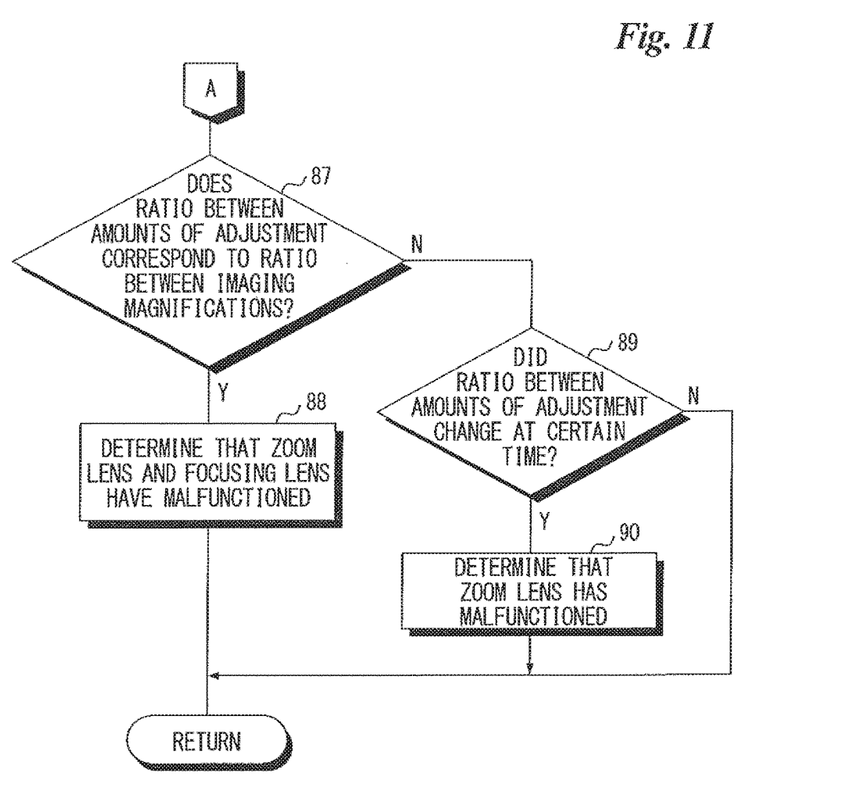

FIGS. 10 and 11 are flowcharts illustrating processing for detecting a faulty location (the processing of step 72 in FIG. 9).

Whether amount of adjustment of the master lens 10 regarding a specific imaging magnification is indicating a change with elapse of time, namely an increase or decrease with time, as indicated by graph G21 in FIG. 4, is checked (step 81). If such a change with elapse of time is being indicated ("YES" at step 81), then whether amount of adjustment of the master lens 10 regarding an imaging magnification other than this specific imaging magnification is indicating no substantial change with elapse of time, namely an increase or decrease with time, is checked (step 82). If the amount of adjustment of the master lens 10 regarding an imaging magnification other than the specific imaging magnification is indicating no substantial change with elapse of time, as indicated by graph G11 in FIG. 4 ("YES" at step 82), then a determination is made to the effect that, of the imaging lenses that constitute the extender lens 7, a malfunction exists in the adjusting section of the imaging lens that has the specific imaging magnification (step 83), as described above.

If there is an indication of change with elapse of time in which the amounts of adjustment of the master lens 10 with regard to all imaging magnifications increase or decrease with time, as indicated by graphs G12 and G22 in FIG. 5 ("YES" at step 81, "NO" at step 82) and, moreover, the difference $\Delta$ between such changes with elapse of time is less than a fixed value ("YES" at step 85), then a determination is made to the effect that there is a malfunction in the master lens 10 (step 86), as described above.

If the difference $\Delta$ between the changes with elapse of time is not less than the fixed value ("NO" at step 85), then it is determined whether the ratio between the amount of adjustment $\Delta M1$ of the master lens 10 regarding a specific imaging magnification and the amount of adjustment $\Delta M2$ of the master lens 10 regarding another imaging magnification corresponds to the ratio between the imaging magnifications of the imaging lenses (step 87), as illustrated in FIG. 6. If they correspond ("YES" at step 87), then a determination is made to the effect that there is a malfunction in an optical system other than that of the extender lens 7 or master lens 10, namely in optical systems such as those of the zoom lens 5 and focusing lens 2 (step 88).

If the ratio between the amounts of adjustment does not correspond to the ratio between the imaging magnifications ("NO" at step 87), it is determined whether the ratio between the amounts of adjustment changed at a certain time (step 89). If the ratio between the amounts of adjustment changed at a certain time ("YES" at step 89), as shown in FIG. 7, then a determination is made to the effect the zoom lens 5 has malfunctioned (step 90).

Thus, a faulty location in the television camera lens 1 is detected from a history of amounts of adjustment of the master lens 10 that correspond to a plurality of imaging lenses having different imaging magnifications.

Figure 12:
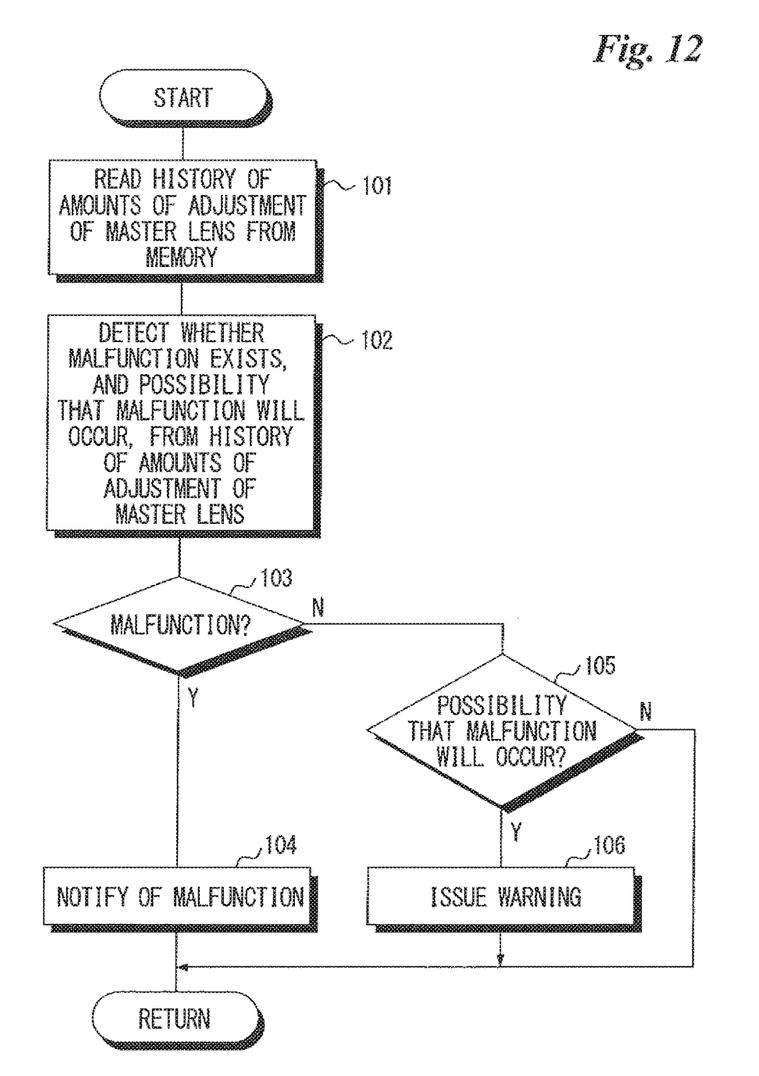
FIG. 12 is a flowchart illustrating malfunction notification processing.

FIG. 12 is a flowchart illustrating malfunction notification processing.

The processing shown in FIG. 12 is such that a warning is issued in a case where there is heightened possibility of the occurrence of a malfunction.

Data indicating a history of amounts of adjustment of the master lens 10 is read from the memory 42 (step 101) in a manner similar to that described above, and whether or not a malfunction exists and the possibility that a malfunction will occur are detected (step 102).

If a faulty location exists ("YES" at step 103), the error LED 44 emits light to notify of the malfunction (step 104), as described above.

If a faulty location does not exist ("NO" at step 103), a determination is made as to whether there is a possibility that a malfunction will occur (step 105). If there is a possibility that a malfunction will occur ("YES" at step 105), then the warning LED 45 emits light to notify of the fact that there is a possibility that a malfunction will occur (step 106).

It is permissible to not only issue a warning in a case where there is a possibility that a malfunction will occur but also to warn of the possibility that a malfunction will occur at a specific location also in a case where a faulty location is specified, as shown in FIGS. 9 to 11. As to whether there is a possibility that the adjusting section of an imaging lens having a specific imaging magnification will malfunction, a separate threshold value lower than the threshold value of FIG. 4 would be set and a warning of said possibility would be issued if the separate threshold value is exceeded. Further, as to whether there is a possibility that the master lens 10 will malfunction, a separate difference threshold value $\Delta 1$ smaller than the threshold value $\Delta$ of FIG. 5 for the difference between the amounts of adjustment would be defined and a warning of said possibility would be issued if the difference between the amounts of adjustment exceeds the difference threshold value $\Delta 1$. Furthermore, as to whether there is a possibility that an optical system other than those of the extender lens 7 and master lens 10 will malfunction, as shown in FIG. 6, a warning of would be issued in response to continuation, for a fixed period of time, of a state in which the ratio between amounts of adjustment $\Delta M1$ and $\Delta M2$ of the master lens 10 corresponds to the ratio between the imaging magnifications of the imaging lenses 8 and 9, as mentioned above. If said state continues beyond the fixed time period, a determination would be made to the effect that an optical system other than that of the master lens 10 has a malfunction. Furthermore, if the ratio between amounts of adjustment ΔM1 and ΔM2 of the master lens 10 corresponds to the ratio between the imaging magnifications of the imaging lenses 8 and 9 up to the certain time t but this corresponding relationship fails to hold when the time t is exceeded, as shown in FIG. 7, then a warning would be issued immediately upon breakdown of this corresponding relationship and, if this state in which the corresponding relationship no longer holds continues after the issuance of the warning, then notification of malfunction of the zoom lens 5 would be given.

As many apparently widely different embodiments of the present invention can be made without departing from the spirit and scope thereof, it is to be understood that the invention is not limited to the specific embodiments thereof except as defined in the appended claims.

What is claimed is:

1. A lens apparatus comprising:
   an imaging optical system for forming the image of a subject on an imaging plane;
   an extender optical system capable of changing over among multiple imaging magnifications;
   a master optical system for adjusting in-focus position;
   a master optical system adjustment amount history memory for storing a history of amounts of adjustment of said master optical system obtained by adjusting the in-focus position by said master optical system per each of the multiple magnifications of said extender lens optical system;
   a malfunction detection unit for detecting whether or not there is a malfunction in the optical systems of the lens apparatus based upon multiple histories that have been stored in said master optical system adjustment amount history memory per each of the multiple magnifications of said extender lens optical system; and
   a malfunction notification unit for giving notification of a malfunction in response to detection of the malfunction by said malfunction detection unit.

2. The apparatus according to claim 1, wherein said malfunction detection unit detects a faulty location in the optical systems that constitute the lens apparatus; and
   said malfunction notification unit gives notification of the faulty location detected by said malfunction detection unit.

3. The apparatus according to claim 1, further comprising:
   a malfunction occurrence possibility detection unit for detecting whether there is a possibility that a malfunction will occur in the lens apparatus, based upon the history amounts of adjustment of said master optical system with regard to the multiple imaging magnifications of said extender optical system, which history has been stored in said master optical system adjustment amount history memory; and
   a warning unit, responsive to a determination by said malfunction occurrence possibility detection unit that there is a possibility that a malfunction will occur, for issuing a warning to inform of the possibility that a malfunction will occur.

4. The apparatus according to claim 2, wherein said malfunction detection unit, responsive to the fact that amounts of adjustment of said master optical system corresponding to some of the imaging magnifications among the multiple imaging magnifications of said extender optical system indicate a change with time and, moreover, the fact that amounts of adjustment of said master optical system corresponding to the other imaging magnifications do not indicate a change with time, for detecting that there is a malfunction in said extender optical system with regard to some of the imaging magnifications, based upon the history of amounts of adjustment of said master optical system with regard to the multiple imaging magnifications of said extender optical system, which history has been stored in said master optical system adjustment amount history memory.

5. The apparatus according to claim 2, wherein said malfunction detection unit, while holding below a fixed value a difference between amounts of adjustment of said master optical system corresponding to respective ones of the multiple imaging magnifications of said extender optical system, detects that there is a malfunction in said master optical system in response to amounts of adjustment indicating a tendency to increase or a tendency to decrease with time.

6. The apparatus according to claim 2, wherein said malfunction detection unit detects that there is a malfunction in an optical system other than said extender optical system and said master optical system in response to the fact a ratio between the amounts of adjustment of said master optical system corresponding to respective ones of the multiple imaging magnifications of said extender optical system corresponds to a ratio between the multiple imaging magnifications of said extender optical system.

7. The apparatus according to claim 3, wherein said malfunction detection unit, responsive to the fact that amounts of adjustment of said master optical system corresponding to some of the imaging magnifications among the multiple imaging magnifications of said extender optical system indicate a change with time and, moreover, the fact that amounts of adjustment of said master optical system corresponding to the other imaging magnifications do not indicate a change with time, for detecting that there is a malfunction in said extender optical system with regard to some of the imaging magnifications, based upon the history of amounts of adjustment of said master optical system with regard to the multiple imaging magnifications of said extender optical system, which history has been stored in said master optical system adjustment amount history memory.

8. The apparatus according to claim 3, wherein said malfunction detection unit, while holding below a fixed value a difference between amounts of adjustment of said master optical system corresponding to respective ones of the multiple imaging magnifications of said extender optical system, detects that there is a malfunction in said master optical system in response to amounts of adjustment indicating a tendency to increase or a tendency to decrease with time.

9. The apparatus according to claim 3, wherein said malfunction detection unit detects that there is a malfunction in an optical system other than said extender optical system and said master optical system in response to the fact a ratio between the amounts of adjustment of said master optical system corresponding to respective ones of the multiple imaging magnifications of said extender optical system corresponds to a ratio between the multiple imaging magnifications of said extender optical system.

10. A method of controlling operation of a lens apparatus having an imaging optical system for forming the image of a subject on an imaging plane, an extender optical system capable of changing over among multiple imaging magnifications, and a master optical system for adjusting in-focus position, comprising steps of:
- storing a history of amounts of adjustment of the master optical system obtained by adjusting the in-focus position by the master optical system per each of the multiple magnifications of the extender lens optical system;
- detecting whether or not there is a malfunction in the optical systems of the lens apparatus based upon multiple histories stored per each of the multiple magnifications of the extender lens optical system; and
- giving notification of a malfunction in response to detection of the malfunction.

\* \* \* \* \*